United States Patent [19]

Ohkawara

[11] 4,379,311
[45] Apr. 5, 1983

[54] RECORDING BIAS SETTING DEVICE FOR A MAGNETIC RECORDING AND REPRODUCING APPARATUS

[75] Inventor: Takashi Ohkawara, Chofu, Japan

[73] Assignee: Nakamichi Corporation, Tokyo, Japan

[21] Appl. No.: 164,492

[22] Filed: Jul. 2, 1980

[30] Foreign Application Priority Data

Jul. 6, 1979 [JP] Japan .................. 54-93082[U]

[51] Int. Cl.³ ............................................. G11B 5/47
[52] U.S. Cl. .................................................... 360/66
[58] Field of Search ........................................ 360/66

[56] References Cited

U.S. PATENT DOCUMENTS

| | | | |
|---|---|---|---|
| 4,092,678 | 5/1980 | Nishikawa | 360/66 |
| 4,245,265 | 1/1981 | Kogure | 360/66 |
| 4,253,122 | 2/1981 | Tabata | 360/66 |
| 4,262,313 | 4/1981 | Mouri | 360/66 |

*Primary Examiner*—Vincent P. Canney
*Attorney, Agent, or Firm*—Pearne, Gordon, Sessions, McCoy, Granger & Tilberry

[57] ABSTRACT

This invention pertains to a recording bias setting device for a magnetic recording and reproducing apparatus. The recording bias setting device comprises means to record and reproduce an AC test signal, means to select a bias current value from among a plurality of predetermined bias current values for recording said AC test signal, an information processor to control said means to select a bias current value in accordance with a reproduced output level of said AC test signal whereby the bias current value is set, said information processor including means to detect a semipeak reproduced output level depending on a semipeak bias current value which provides the maximum reproduced output level of said test signal among the selected bias current values, means to detect among said selected bias current values a first bias current value less than said semipeak bias current value and a second bias current value greater than said semipeak bias current value, both of which provide reproduced output levels lower than said semipeak reproduced output level by substantially equal amounts, and means to control said means to select a bias current value so that the bias current is set at a value substantially equal to an average value of said first and second bias current values.

2 Claims, 5 Drawing Figures

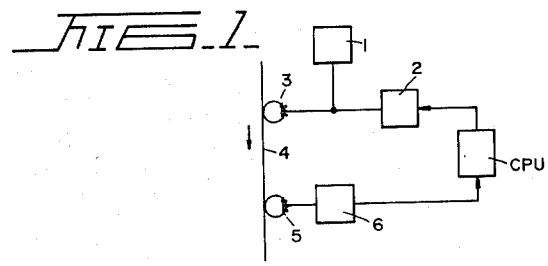
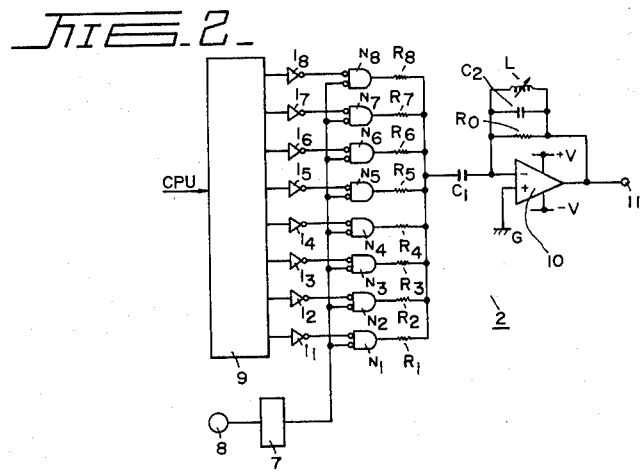

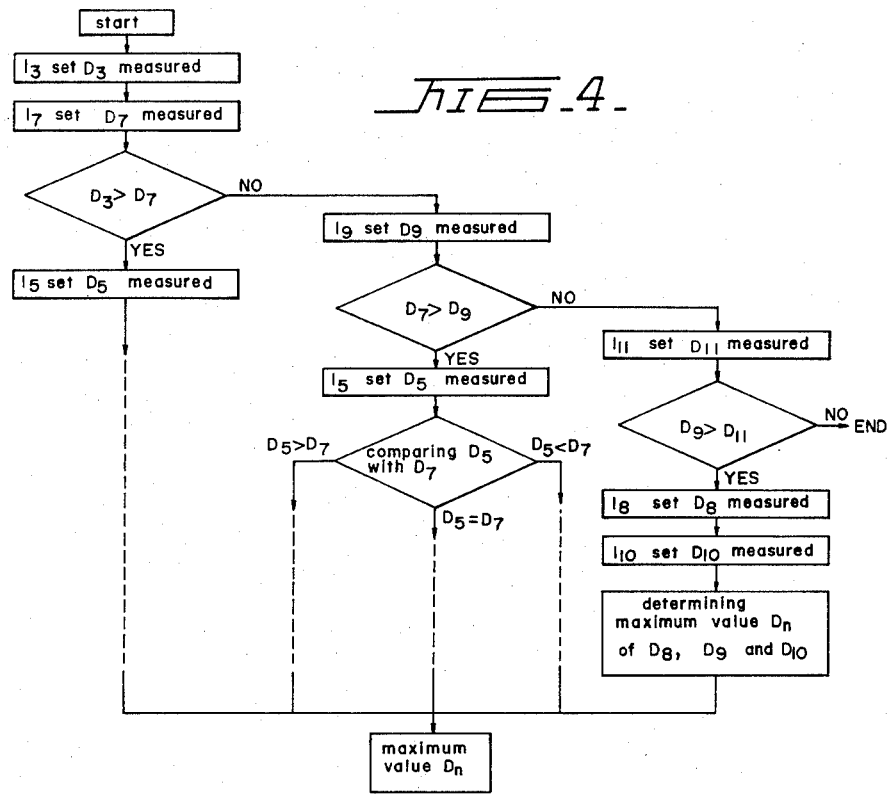
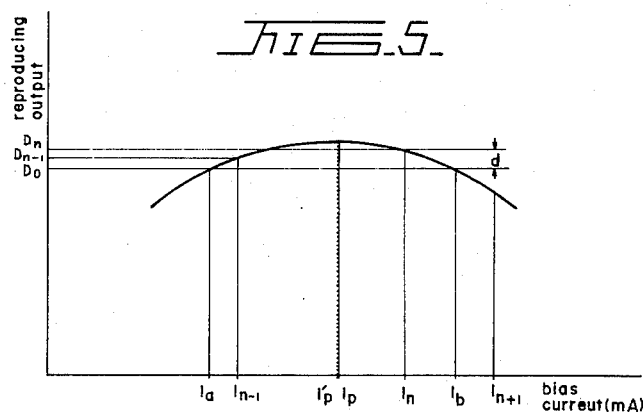

RECORDING BIAS SETTING DEVICE FOR A MAGNETIC RECORDING AND REPRODUCING APPARATUS

BACKGROUND OF THE INVENTION

In a magnetic recording and reproducing apparatus, a bias current value which is most suitable for a magnetic characteristic of a magnetic tape used is required to be automatically set. In the prior art, variation in a reproduced output level is detected by sequentially changing a bias current from its low to high value or from its high to low value while a test signal is being recorded and reproduced, and then determining the optimum bias current value which provides the maximum reproduced output level.

Of late, there have been used various kinds of magnetic tapes which have the optimum bias current value different from each other. Although the optimum bias current value depends on a magnetic head used, for example, it is about 1.0 mA for a normal tape, about 2.0 mA for a chromium dioxide tape and about 4 mA for a metallic tape. Accordingly, in order to set optimum bias current value for these three kinds of magnetic tapes, the bias current is required to be sequentially changed over a wide range of 0 to 5 mA, for example. However, this causes consumption of time for setting the optimum bias current for the particular magnetic tape especially because the bias current value should be changed bit by bit for precisely setting optimum bias current value for overcoming such a problem. It may be proposed that the optimum bias current value is set in a shorter time by changing the initial value of bias current sequentially in accordance with the type of magnetic tape used in association with a manual operation of selecting means such as a tape selector switch. However, this requires a troublesome operation by the user and inevitably makes the construction of the circuit complicated. Furthermore, since the reproduced output level depending on the bias current value near the optimum bias current value is substantially equal, it is difficult to precisely determine the peak bias.

SUMMARY OF THE INVENTION

Accordingly, it is a principle object of the invention to provide a recording bias setting device for a magnetic recording and reproducing apparatus in which a bias current value is not required to be sequentially changed over a wide range.

It is another object of the invention to provide a recording bias setting device for a magnetic recording and reproducing apparatus in which an optimum bias current value can be automatically set with precision in a shorter time.

In accordance with the invention, there is provided:
a recording bias setting device for a magnetic recording and reproducing apparatus comprising means to record and reproduce an AC test signal;

means to select a bias current value from among a plurality of predetermined bias current values for recording said AC test signal;

an information processor to control said means to select a bias current value in accordance with a reproduced output level of said AC test signal whereby the bias current value is set;

said information processor including means to detect a semipeak reproduced output level depending on a semipeak bias current value which provides the maximum reproduced output level of said test signal among the selected bias current values, means to detect among said selected bias current values a first bias current value less than said semipeak bias current value and a second bias current value greater than said semipeak bias current value, both of which provide reproduced output levels lower than said semipeak reproduced output level by substantially equal amounts, and means to control said means to select a bias current value so that the bias current is set at a value substantially equal to an average value of said first and second bias current values.

BRIEF DESCRIPTION OF THE DRAWINGS

The above and other objects and features of the invention will be apparent from the description of the embodiment taken with reference to the accompanying drawings in which:

FIG. 1 is a schematic diagram of a recording bias setting device of the invention;

FIG. 2 is a schematic diagram of a bias oscillator used in an embodiment of the invention;

FIG. 3 shows various values of bias current determined on the information of control signals of a central processing unit for describing the operation of the invention;

FIG. 4 is a flow chart of a program of the central processing unit used in the embodiment of the invention; and FIG. 5 shows how to determine the optimum bias current value on the detected semipeak bias value.

DETAILED DESCRIPTION OF THE EMBODIMENT

Referring now to FIG. 1, an AC test signal of given amplitude and frequency such as 400 Hz, for example, is oscillated from a test signal oscillator 1 and a high frequency bias signal from a bias oscillator 2 is multipied into the AC test signal. These signals are recorded on a magnetic tape 4 by a recording head 3 and simultaneously reproduced from the magnetic tape 4 by a reproducing head 5. A reproduced output level of the test signal is converted by an analog-to-digital converter 6 into a digital information of 8 bits which is introduced into a central processing unit CPU. The central processing unit serves to control the bias oscillator 2, thereby varying the amplitude of the bias signal.

The bias oscillator 2 may be constructed as shown in FIG. 2. In the bias oscillator 2, a high frequency signal from a crystal oscillator 8 is divided in its frequency by a frequency divider 7 to produce a square wave of 105 kHz, for example, which is introduced into NAND gates $N_1$ to $N_8$ at respective one of their inputs. To the other inputs of the NAND gates $N_1$ to $N_8$ are connected through respective inverters $I_1$ to $I_8$ to an output of latching means 9 which latches a control signal of 8 bits from the central processing unit CPU. Respective outputs of the NAND gates $N_1$ to $N_8$ are connected through respective resistors $R_1$ to $R_8$ and then through a common coupling capacitor $C_1$ to a negative input terminal of an operational amplifier 10, a positive input terminal of which is grounded to earth G.

A circuit in which a resistor $R_0$ is connected in parallel to a resonance circuit of a variable inductor L and a capacitor $C_2$ is connected across the negative input terminal and the output terminal of the operational amplifier 10. An output signal from the output terminal 11 of the bias oscillator is introduced through a conventional circuit into the recording head 3. The resistance values of the resistors $R_0$ and $R_1$ to $R_8$ are so set to be $R_1=2R_0$, $R_2=2^2R_0$, - - - and $R_8=2^8 R_0$.

It will be noted that the operational amplifier 10 may have 255 different input resistance values determined by combinations of eight resistors $R_1$ to $R_8$ in accordance with the control signal of 8 bits from the central processing unit CPU. Therefore, a bias current may have 256 values including zero, different from each other and of integral multiples of 255 equal parts or units of the level of the maximum bias current. The bias current value may be maximum at the control signal of "1,1,1,1,1,1,1,1" from the central processing unit CPU and zero at the control signal of "0,0,0,0,0,0,0,0".

In operation, a plurality of bias current values numbering m $i_0$, $i_2$, - - - $i_m$ may be selected from 256 different bias current values within the range of 0 to 5 mA. The bias vales of $i_1$, $i_2$, - - - $i_m$ may becomes sequentially higher and are determined on 8 bits of the control signal from the central processing unit CPU. Thus, it will be understood that the maximum bias current value $i_m$ corresponds to the control signal of "1,1,1,1,1,1,1,1" from the central processing unit CPU and may have the value of 5 mA. Briefly, a semipeak bias value which provides the maximum reproduced output level of the test signal is detected from among a plurality of bias current values numbering m values. This can be done in a short time by a stored program of the central processing unit CPU as shown in FIG. 4.

In this case, the number of bias current values selected from among 256 different bias current values is 12. As shown in FIG. 3, these 12 bias current values $i_0$ to $i_{11}$ may be determined by the control signals of the central processing unit CPU. In FIG. 3, the bias current values have been rounded to the nearest tenth.

In the stored program of the central processing unit CPU shown in FIG. 4, the bias current value $1_3$ is firstly set regardless of the kind of the magnetic tape used and the test signal is recorded with the bias current value $i_3$ and reproduced. At that time, the reproduced output level $D_3$ is measured and converted by the analog-to-digital converter 6 into digital information of 8 bits which is stored by the central processing unit CPU. The maximum reproduced output level is indicated at 1,1,1,1,1,1,1,1. Thereafter, the reproduced output level $D_7$ depending on the bias current value $i_7$ is measured and operationally compared with the reproduced output level $D_3$. Suppose that a metallic tape which has the peak bias current value of about 4 mA is used, the reproduced output level $D_3$ is detected to be lower than the reproduced output level $D_7$. Accordingly, the reproduced output level $D_9$ depending on the bias current value $i_9$ is then measured and operationally compared with the reproduced output level $D_7$. If the reproduced output level $D_7$ is detected to be lower than the reproduced output level $D_9$, then this means that the peak bias value is higher than the bias current value $i_9$. In this case, the maximum reproduced output level $D_{11}$ depending on the maximum bias current value $i_{11}$ is measured and operationally compared with the reproduced output level $D_9$. If the reproduced output level $D_9$ is lower than the reproduced output level $D_{11}$, then no more measurement can be made with the END indicated. If the reproduced output level $D_9$ is higher than the reproduced output level $D_{11}$, then this indicates that there is a peak level depending on the optimum bias current value between the reproduced output levels $D_7$ and $D_{11}$. Thus, the bias current values $i_8$ and $i_{10}$ are sequentially set to measure the reproduced output levels $D_8$ and $D_{10}$. It will be understood that the maximum value $D_n$ of semipeak reproduced output level can be determined from among the reproduced output levels $D_8$, $D_9$ and $D_{10}$. In the comparison of the reproduced output level $D_3$ with $D_7$, if the reproduced output level $D_3$ is higher than the reproduced output level $D_7$, then the reproduced output level $D_5$ is measured by setting the bias current value $i_5$ which is between the bias current values $i_3$ and $i_7$ and operationally compared with the reproduced output level $D_3$. Thus, the semipeak bias current value $i_n$ and the semipeak reproduced output level $D_n$ can be determined from among the bias current values $i_1$ to $i_{11}$ and the reproduced output levels $D_1$ to $D_{11}$.

Next, the optimum bias current value can be determined on the semipeak bias current value $i_n$ and the semipeak reproduced output level $D_n$. This will be described hereinjustbelow with reference to FIG. 5. This figure shows a bias curve of a magnetic tape in which the reproduced output is indicated relative to the bias current. It will be noted that the semipeak bias current value $i_n$ is near the peak bias current value $i_p$ which corresponds to the optimum bias current value. There is determined a first bias current value $i_a$ lower than a semipeak bias current value $i_n$ which provides a reproduced output level $D_0$ lower a predetermined amount d than the semipeak reproduced output level $D_n$ and a second bias current value $i_b$ greater than the semipeak bias current value $i_n$. Thereafter, an average bias current value $i'_p$ of the first and second bias current values $i_a$ and $i_b$ which substantially corresponds to the optimum bias current value $i_p$ is determined. The determination of the first and second bias current values $i_a$ and $i_b$ and the average bias current value $i'_p$ is accomplished by the stored program of the central processing unit CPU in the same manner as that in which the detection of the semipeak reproduced output level $D_n$ is made. For example, the reproduced output level $D_0$ is determined by subtracting the level d from the reproduced output level $D_n$. Thereafter, the bias current value $i_{n-1}$ one step lower than the semipeak bias current value $i_n$ is set from among the bias current values $i_1$, $i_2$ - - - $i_{11}$ and the reproduced output level $D_{n-1}$ depending on the bias current value $i_{n-1}$ is measured and operationally compared with the level $D_0$. If the level $D_0$ is lower than the level $D_{n-1}$ as shown in FIG. 5, reproduced output levels $D_{a1}$, $D_{a2}$, $D_{a3}$ and so on which are measured on bias current values $i_{a1}$, $i_{a2}$, $i_{a3}$ and so on obtained by sequentially deducting one unit of bias current value from the bias current value $i_{n-1}$ are operationally compared with the level $D_0$ to determine the first bias current value $i_a$ which provides the level substantially equal to the level $D_0$. If the level $D_0$ is higher than the level $D_{n-1}$, first bias current value $i_a$ is determined by sequentially adding one unit of bias current value to the bias current value $o_{n-1}$. Similarly, the second bias current $i_b$ is determined by sequentially deducting or adding one unit of bias current value from or to a bias current value $i_{n+1}$ greater by one step than the semipeak bias current value $i_n$. Thus, the average bias current value $i'_p$ of the first and second bias values $i_a$ and $i_b$ is determined as one of the 255 bias current values which can be set by the bias oscillator 2. The central processing unit CPU generates the control signal corresponding to the bias current value $i'_p$ to control the bias oscillator 2, thereby setting the bias current value $i'_p$. It will be noted that since the bias curve is substantially a parabola having the peak of current value $i_p$, the average current value $i'_p$ can substantially approach the optimum bias current value $i_p$ if one unit of bias current value is finely determined.

While one preferred embodiment of the invention has been described and illustrated with reference to the accompanying drawings, it will be understood by those skilled in the art that it is by way of example and that various modifications may be made within the spirit of the invention, which is intended to be defined by only the appended claims.

What is claimed is:

1. A recording bias setting device for a magnetic recording and reproducing apparatus comprising:
   means to record and reproduce an AC test signal;
   means to select a bias current value from among a plurality of predetermined bias current values for recording said AC test signal;
   an information processor to control said means to select a bias current value in accordance with a reproduced output level of said AC test signal whereby the bias current value is set;
   said information processor including means to detect a semipeak reproduced output level depending on a semipeak bias current value which provides the maximum reproduced output level of said test signal among the selected bias current values, means to detect among said selected bias current values a first bias current value less than said semipeak bias current value and a second bias current value greater than said semipeak bias current value, both of which provide reproduced output levels lower than said semipeak reproduced output level by substantially equal amounts, and means to control said means to select a bias current value so that the bias current is set at a value substantially equal to an average value of said first and second bias current values.

2. A recording bias setting device as set forth in claim 1, and said means to select a bias current value from among a plurality of predetermined bias current values, comprising a high frequency oscillator, a frequency divider to divide the frequency of a high frequency signal to generate a square wave signal, a plurality of NAND gates having one input connected to the output of said frequency divider and another input connected to said information processor, a plurality of resistors having one end connected to outputs of said NAND gates, respectively, and an operational amplifier having one input connected through a coupling capacitor to other ends of said resistors and another input grounded.

* * * * *

UNITED STATES PATENT AND TRADEMARK OFFICE
CERTIFICATE OF CORRECTION

PATENT NO. : 4,379,311
DATED : April 5, 1983
INVENTOR(S) : Takashi Ohkawara

It is certified that error appears in the above—identified patent and that said Letters Patent is hereby corrected as shown below:

Column 1, line 14, delete "determining" and insert --determines--.

Column 3, line 19, delete "vales" and insert --values--

Column 5, lines 2 and 3, before "current", insert --bias--.

Column 5, line 11, delete "by only" and insert --only by--.

Signed and Sealed this

Thirtieth Day of August 1983

[SEAL]

Attest:

GERALD J. MOSSINGHOFF

Attesting Officer  Commissioner of Patents and Trademarks